(12) United States Patent
Fukunaga et al.

(10) Patent No.: US 6,518,470 B1
(45) Date of Patent: Feb. 11, 2003

(54) HALOGEN-CONTAINING CATALYST AND PROCESS FOR THE PREPARATION THEREOF

(75) Inventors: Tetsuya Fukunaga, Chiba-ken (JP); Mitsue Ishii, Chiba-ken (JP)

(73) Assignees: Idemitsu Kosan Co., Ltd., Tokyo (JP); Chevron Phillips Chemical Company, The Woodlands, TX (US)

( * ) Notice: Subject to any disclaimer, the term of this patent is extended or adjusted under 35 U.S.C. 154(b) by 0 days.

(21) Appl. No.: 09/424,874

(22) PCT Filed: Jun. 5, 1998

(86) PCT No.: PCT/JP98/02502
§ 371 (c)(1),
(2), (4) Date: Jan. 4, 2000

(87) PCT Pub. No.: WO98/56502
PCT Pub. Date: Dec. 17, 1998

(30) Foreign Application Priority Data

Jun. 12, 1997 (JP) .............................................. 9-154726
Jun. 12, 1997 (JP) .............................................. 9-154727
Nov. 21, 1997 (JP) .............................................. 9-320736

(51) Int. Cl.[7] ........................... C07C 15/00; C07C 2/52; B01J 29/60; B01J 29/62

(52) U.S. Cl. ..................... 585/407; 585/418; 585/419; 502/64; 502/66; 502/74; 502/224; 502/230

(58) Field of Search .............................. 502/64, 66, 74, 502/224, 230, 60; 585/407, 418, 419

(56) References Cited

U.S. PATENT DOCUMENTS

| 4,568,656 | A | * | 2/1986 | Poeppelmeier et al. |
| 4,681,865 | A | * | 7/1987 | Katsuno et al. |
| 4,914,068 | A | * | 4/1990 | Cross et al. |
| 5,091,351 | A | * | 2/1992 | Murakawa et al. |
| 5,294,579 | A | * | 3/1994 | Ohashi et al. |
| 5,314,854 | A | * | 5/1994 | Galperin |
| 5,851,379 | A | * | 12/1998 | Innes et al. |
| 6,096,936 | A | * | 8/2000 | Fukunaga et al. |
| 6,207,042 | B1 | * | 3/2001 | Holtermann et al. |

FOREIGN PATENT DOCUMENTS

| EP | 0 498 182 | 8/1992 |
| JP | 5-47266 | 7/1993 |
| JP | 6-256232 | 9/1994 |
| JP | 7-108771 | 11/1995 |
| WO | WO 98/30657 | 7/1998 |

* cited by examiner

*Primary Examiner*—Stanley S. Silverman
*Assistant Examiner*—Christina Ildebrando
(74) *Attorney, Agent, or Firm*—McDermott, Will & Emery

(57) ABSTRACT

The present invention is directed to a halogen-containing catalyst which contains one or more halogen components and in which the halogen amount distribution in the catalyst is uniform, and a process for preparing a halogen-containing catalyst which comprises the steps of supporting one or more halogen components on an L type zeolite, and then drying it at a water evaporation rate of 15% by weight/hour or less. According to the present invention, there can be provided the catalyst in which the halogen amount distribution in the catalyst is uniform, so that a cracking activity can be reduced, and the process for preparing the catalyst.

21 Claims, 1 Drawing Sheet

DIRECTION OF LINEAR ANALYSIS

HALOGEN-CONTAINING CATALYST AND PROCESS FOR THE PREPARATION THEREOF

TECHNICAL FIELD

The present invention relates to a catalyst for use in the production of aromatic hydrocarbons and a process for preparing the same. More specifically, it relates to a halogen-containing catalyst such as one or more halogen components and a platinum supported on L type zeolite catalyst in which the halogen amount distribution is uniform and a cracking activity can be reduced, and a process for preparing the catalyst.

BACKGROUND ART

Heretofore, as a catalyst which can be used to manufacture aromatic hydrocarbons by aromatizing non-aromatic hydrocarbons such as aliphatic hydrocarbons, platinum-alumina catalysts have been used. However, such catalysts have a drawback that hydrocarbons having 6 or 7 carbon atoms cannot efficiently be converted into aromatic hydrocarbons.

In order to solve such a problem, a catalyst in which platinum is supported on an L type zeolite has been suggested in Japanese Patent Publication No. 57408/1983, and afterward, with regard to the L type zeolite, various methods have been suggested for the improvement of an activity, a selectivity, a catalyst life and the like, or for the simplification of a catalyst preparation method.

For example, there have been suggested (1) a catalyst in which the L type zeolite supporting a metal in the group VIII has been subjected to an oxychlorination treatment to thereby improve a catalytic activity and a catalyst life (Japanese Patent Application Laid-open No. 168539/1985), (2) a catalyst treated with a solution comprising a platinum solution and a non-platinum metal salt in order to uniformly disperse and support platinum (Japanese Patent Application Laid-open No. 138539/1986), (3) a catalyst in which platinum is supported on an L type zeolite treated with a halogen-containing compound (Japanese Patent Application Laid-open No. 57653/1987), (4) a catalyst in which an L type zeolite supporting platinum is treated with a halogen-containing compound (Japanese Patent Application Laid-open No. 91334/1988), and (5) a catalyst obtained by a simple preparation method which comprises simultaneously supporting and treating a platinum component and one or more halogen components on an L type zeolite (Japanese Patent Application Laid-open No. 49936/1993).

However, the catalysts of the above-mentioned (1) to (5) have some problems in a practical use thereof, and in all of these catalysts, a cracking activity is high. In consequence, an aromatic selectivity is not sufficient.

DISCLOSURE OF THE INVENTION

The present invention has been developed under the above circumstances. That is to say, an object of the present invention is to provide a catalyst for use in the manufacture of aromatic hydrocarbons in which the halogen amount distribution in the catalyst is uniform, so that a cracking activity can be reduced.

Another object of the present invention is to provide a process for preparing the above-mentioned catalyst.

The present inventors have intensively researched with the intention of developing, as a catalyst for the manufacture of aromatics, a practical catalyst which can solve the problems of the above-mentioned conventional catalysts and in which a cracking activity can be reduced, and as a result, it has been found that when a water evaporation rate is retarded in a drying step in the preparation of the catalyst, the catalyst in which a halogen amount distribution in the catalyst is uniform can be obtained, so that the object of the present invention can effectively be achieved. The present invention has been completed on the basis of this knowledge.

That is to say, a first aspect of the present invention is directed to a halogen-containing catalyst which contains one or more halogen components and in which the halogen amount distribution in the catalyst is uniform, particularly, a halogen-containing catalyst wherein, in a drawing showing a relation between a sectional width direction distance (x: a distance from one catalyst surface) and an X-ray intensity (I) obtained by subjecting a halogen atom on a catalyst section to a linear analysis measurement in one direction by the use of an electron probe microanalysis (hereinafter referred to as "the EPMA") device, a ratio $\alpha [\{(F-F_0)/F\}$ of a value $(F-F_0)$ to an integrated value $(F)]$ is 0.17 or less, and the value $(F-F_0)$ is obtained by subtracting a value $(F_0)$ obtained by integrating an X-ray intensity $(I_0)$ of a tangent of a curve at the minimum and smallest value of the curve indicating the X-ray intensity with respect to x between one catalyst surface and the other catalyst surface, from the value $(F)$ obtained by integrating the above mentioned I with respect to x between the surfaces.

A second aspect of the present invention is directed to a process for preparing a halogen-containing catalyst which comprises the steps of supporting one or more halogen components on a carrier, particularly an L type zeolite, and then drying it at a water evaporation rate of 15% by weight/hour or less.

BEST MODE OF CARRYING OUT THE INVENTION

Figure 1:
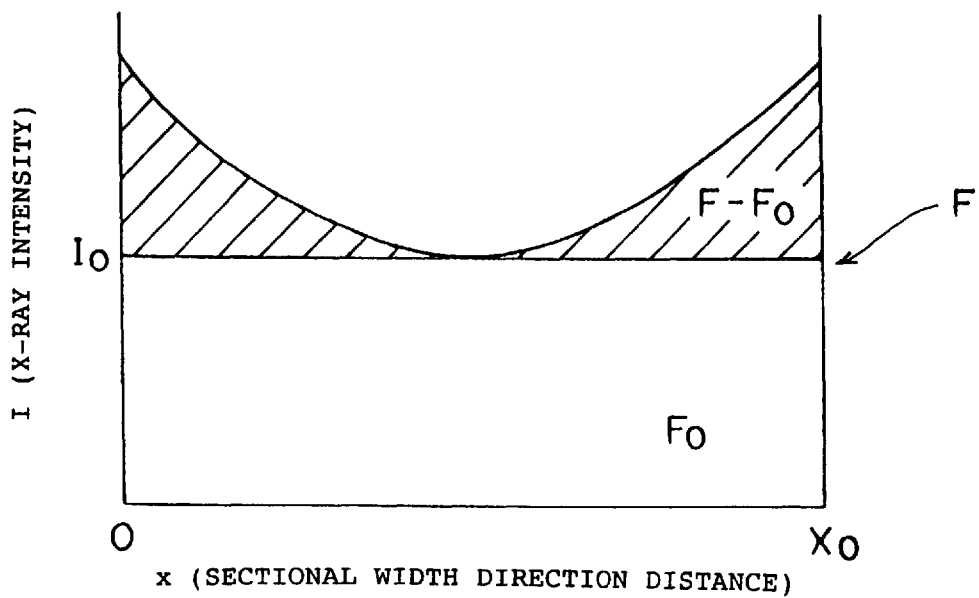
FIG. 1 shows a relation between a width direction distance (x) and an x-ray intensity (I) in the case that a halogen atom is subjected to a linear analysis measurement by the use of an EPMA device.

A halogen-containing catalyst of the present invention has such a uniform halogen amount distribution as is described above. FIG. 1 shows a halogen amount distribution in the halogen-containing catalyst of the present invention, and shows a relation between a width direction distance (x) and an X-ray intensity (I) in the case that a halogen atom is subjected to a linear analysis measurement by the use of an EPMA. Furthermore, FIG. 2 is a perspective view showing one example of an L type zeolite catalyst for use in the above-mentioned EPMA measurement.

The present invention will be described in more detail with reference to FIGS. 1 and 2.

Figure 2:
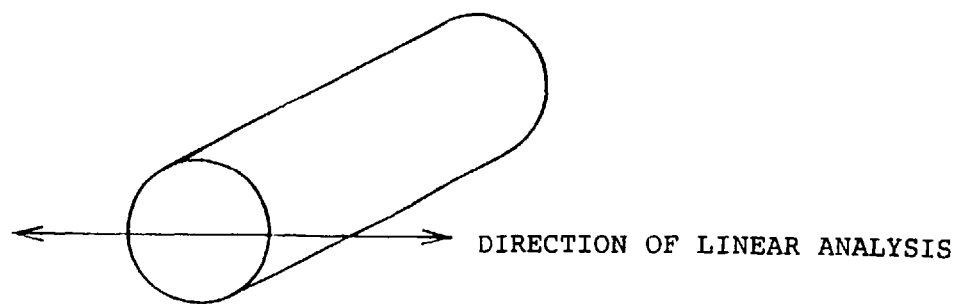
FIG. 2 is a perspective view showing one example of an L type zeolite catalyst for use in the EPMA measurement.

In the case that the catalyst of the present invention has, for example, such a cylindrical shape as in FIG. 2, the linear analysis measurement of the EPMA is carried out in a straight direction shown in the drawing with respect to a cut section parallel with a bottom surface. FIG. 1 shows the obtained results of the linear analysis measurement in connection with a relation between a sectional width direction distance (x: a distance from one catalyst surface) which is an abscissa axis and an X-ray intensity (I) showing a halogen atom concentration which is an ordinate axis. According to FIG. 1, in the halogen-containing catalyst of the present invention, a ratio α [{(F–$F_0$)/F} of a value (F–$F_0$) to an integrated value (F)] is 0.17 or less, wherein the value (F–$F_0$) is a value calculated by subtracting a value ($F_0$) obtained by integrating an X-ray intensity ($I_0$) of a tangent of a curve at the minimum and smallest value of the curve indicating the X-ray intensity with respect to x between one catalyst surface (x=0) and the other catalyst surface (x=$x_0$), from the value (F) obtained by integrating the above-mentioned I with respect to x between the surfaces (x; 0-$x_0$). If the α value is larger than 0.17, a cracking selectivity increases, and as a result, an aromatic selectivity lowers unpreferably. From such a viewpoint, in the present invention, the α value is preferably 0.15 or less.

Furthermore, the above-mentioned linear analysis measurement of the present invention can be applied to the catalyst having any shape, and so long as the catalyst has the above-mentioned α value, an effect peculiar to the present invention can be exerted. Therefore, no particular restriction is put on the shape of the catalyst according to the present invention. In the present invention, however, the catalyst having a cylindrical shape can preferably be used from the viewpoints of molding easiness and catalyst strength.

In order to produce the novel L type zeolite catalyst of the present invention, a conventional L type zeolite is used as a raw material. Here, the raw material L type zeolite can be represented by a composition formula 0.9–1.3$M_{2/n}$O.$Al_2O_3$.5.0–7.0$SiO_2$.0–9$H_2O$ (wherein M is an alkali metal or an alkaline earth metal, and n is a valence of M), and typical examples of the zeolite are disclosed on pages 9 and 10 of Japanese Patent Application Laid-open No. 133835/1983 as well as page 5 of Japanese Patent Application Laid-open No. 80333/1984.

The novel L type zeolite catalyst of the present invention can be produced by supporting one or more halogen components and a metal-containing compound, particularly a platinum-containing compound on the above-mentioned raw material L type zeolite. By supporting one or more halogen components and a metal component such as the platinum component in this way, an excellent catalyst activity and catalytic life which have not been present so far can be imparted.

Here, examples of the halogen-containing compound include various compounds, and no particular restriction is put on it. Typical examples of the halogen-containing compound include chlorine-containing compounds such as hydrogen chloride and ammonium chloride, fluorine-containing, compounds such as hydrogen fluoride and ammonium fluoride, iodine-containing compounds such as hydrogen iodide and ammonium iodide, and bromine-containing compounds such as hydrogen bromide and ammonium bromide. With regard to the halogen-containing compound, the above-mentioned compounds can be used singly or as a mixture of two or more thereof, and a combination of the chlorine-containing compound and the fluorine-containing compound is particularly preferable.

Furthermore, as the metal-containing compound, the platinum-containing compound is preferably used, and no particular restriction is put on the platinum-containing compound, so long as it becomes a platinum source, but usually a platinum salt is used. Typical examples of the platinum-containing compound include tetramineplatinum chloride, chloroplatinic acid, chloroplatinates, tetrammineplatinum hydroxide and dinitrodiaminoplatinum.

In the process for preparing the novel L type zeolite catalyst of the present invention, no particular restriction is put on a method for supporting a metal component such as the platinum component and the one or more halogen components on the raw material L type zeolite, and there can be used any of an atmospheric impregnation process, a vacuum impregnation method, an osmosis method and an ion exchange method which are usually carried out. In addition, when the metal-containing compound and the one or more halogen-containing compounds are supported on the raw material L type zeolite, they may simultaneously be supported, but after the metal is previously supported, the halogen(s) may then be supported. Alternatively, its reverse procedure is also possible.

No particular restriction is put on the amounts of the compounds to be supported in the supporting step, but the amount of a metal-containing compound such as the platinum-containing compound to be supported is usually preferably in the range of 0.1 to 5.0% by weight in terms of the metal based on the total weight of the catalyst, and particularly, the range of 0.3 to 1.5% by weight is optimum. Moreover, the amount of the one or more halogen-containing compounds to be supported is usually preferably in the range of 0.1 to 5.0% by weight in terms of the halogen based on the total weight of the catalyst. In the case that the amounts of the metal-containing compound and the halogen-containing compound to be supported deviate from the above mentioned ranges, the improvement effect of the catalytic activity does not appear on occasion.

In the present invention, no particular restriction is put on supporting conditions, and they may suitably be selected in compliance with circumstances. Usually, the L type zeolite may be brought into contact with the one or more halogen-containing compounds and the metal-containing compound at room temperature to 90° C. for 1 minute to 10 hours.

In the preparation of the halogen-containing catalyst of the present invention, the supported L type zeolite is dried after the one or more halogens and the metal have been supported or in a step between the steps of supporting the metal and the halogen, and at this time, either of vacuum drying and atmospheric drying can be used as a drying method. In the present invention, rotary drying or vacuum rotary drying is preferable from the viewpoint of a halogen distribution.

Moreover, in the present invention, after the supporting of the halogen have been carried out, it is preferable to relatively slowly do the drying. In the case that a metal such as platinum and one or more halogen components are successively supported in this order, it is preferred that a drying speed in the drying step after the supporting of the halogen (s) is relatively slow. Alternatively, in the case that one or more halogen components and the metal are successively supported in this order, it is preferred that the drying speed in the drying step after the supporting of the halogen(s), i.e., the drying speed in the drying step between a halogen(s) supporting step and a metal supporting step is relatively slow. Furthermore, it is preferable to slowly dry the zeolite not only in the drying step between the steps of supporting one or more halogen components and the metal successively in this order but also in the drying step after the supporting of the metal.

Alternatively, in the case that the metal and one or more halogen components are simultaneously supported, it is preferred that after the supporting, the drying speed in the drying step is slow.

As the drying operation, the drying is first done at a low temperature for a certain time and afterward at a high temperature, or in the case that the drying is done under temperature rise, it is desirable to decrease a temperature rise rate.

Furthermore, in order to remove water from the system, among the above-mentioned drying methods, the vacuum drying is particularly preferable. A vacuum degree in the vacuum drying is optional in a range where a water evaporation rate of the present invention is satisfied, but it is preferably in the range of 5 to 750 Torr, more preferably 30 to 720 Torr.

Moreover, in the above-mentioned drying step, the drying is preferably carried out at a water evaporation rate of 15% by weight/hr or less. If the water evaporation rate is more than 15% by weight/hr, the halogen is nonuniformly supported on the catalyst, which is not preferable on occasion. From such a viewpoint, it is further preferable that the water evaporation rate is 10% by weight/hr or less. If the water evaporation rate is 15% by weight/hr or less, the drying may be carried out at a constant temperature or while the temperature is raised. In the case that the drying is done while the temperature is raised, the temperature may be raised at a stepwise ratio or at a constant ratio. In the present invention, there can particularly preferably be used a method in which the drying is done at a temperature in the range of 25 to 60° C. for 10 to 180 minutes, and the temperature is then raised up to a level in the range of 70 to 250° C. over 5 to 120 minutes, and at the temperature is kept constant for 10 to 180 minutes, with the rotary drying or the vacuum rotary drying being done in all temperature range, or a method in which the temperature is raised from a level in the range of 0 to 60° C. to a level in the range of 70 to 250° C. over 100 to 180 minutes, and the temperature is kept constant for 10 to 80 minutes, with the rotary drying or the vacuum rotary drying being done in all temperature range. Above all, preferable examples of the above-mentioned drying step include a method in which the drying is done at 40° C. for 2 hours and the temperature is then raised up to 100° C. over 40 minutes, and the temperature is kept at 100° C. for 30 minutes with the rotary drying or the vacuum rotary drying is done in all temperature range, and a method in which the temperature is raised from 40° C. to 100° C. over 2 hours and 30 minutes, and the temperature is kept at 100° C. for 30 minutes with the rotary drying or the vacuum rotary drying is done in all temperature range.

Furthermore, it is preferable that the catalyst is calcined at a higher temperature than the above-mentioned drying temperature, for example, at a temperature of 250 to 350° C. In the case that the calcination temperature deviates from the above-mentioned range, the catalytic activity is not sufficient on occasion. In the present invention, no particular restriction is put on an atmosphere at the time of the calcination, but it can usually be carried out in air. In this case, the calcination can be done under the stream of the air, or it can be done without any stream or the air.

The halogen-containing catalyst regarding the present invention comprises the above-mentioned L type zeolite, but if necessary, a natural or a synthetic inorganic oxide such as alumina, silica or an aluminosilicate can be added thereto as a binder. The amount of the binder to be used is preferably in the range of 5 to 90% by weight based on the total weight of the catalyst.

Examples of a hydrocarbon as a raw material, to which the halogen-containing catalyst of the present invention can be applied, include paraffinic hydrocarbons, olefinic hydrocarbons, acetylenic hydrocarbons, cycloparaffinic hydrocarbons and cycloolefinic hydrocarbons, and they can be used singly or in the form of a mixture of two or more thereof.

The above-mentioned paraffinic hydrocarbons preferably have 6 to 10 carbon atoms, and typical examples of the paraffinic hydrocarbons include n-hexane, methylpentane, n-heptane, methylhexane, dimethylpentane and n-octane.

Furthermore, the above-mentioned olefinic hydrocarbons preferably have 6 to 10 carbon atoms, and typical examples of the olefinic hydrocarbons include hexene, methylpentene, heptene, methylhexene, dimethylpentene and octene. The above-mentioned acetylenic hydrocarbons preferably have 6 to 10 carbon atoms, and typical examples of the acetylenic hydrocarbons include hexyne, heptyne and octyne.

The above-mentioned cycloparaffinic hydrocarbons preferably have 6 to 10 carbon atoms, and typical examples of the cycloparaffinic hydrocarbons include methylcyclopentane, cyclohexane, methylcyclohexane and dimethylcyclohexane.

In addition, the above-mentioned cycloolefinic hydrocarbons preferably have 6 to 10 carbon atoms, and typical examples of the cycloolefinic hydrocarbons include methylcyclopentene, cyclohexene, methylcyclohexene and dimethylcyclohexene.

As described above, in a halogen-containing catalyst of the present invention, a halogen amount distribution in a catalyst can be uniformed by retarding a water evaporation rate in a drying step in a preparation process, and as a result, a metal such as platinum is highly dispersed, so that a cracking selectivity lowers and an aromatic selectivity rises. Thus, a cracking activity can be controlled.

The present invention will be described in more detail in accordance with examples and a comparative example.

EXAMPLE 1

(1) Preparation of a Catalyst 20 parts by weight of a silica binder (Snow Tex, made by Nissan Chemical Co., Ltd.) was added to 100 parts by weight of an L type zeolite (TSZ-500KOA, made by Toso Co., Ltd.), followed by kneading and molding. Afterward, calcination was carried out in air at 500° C. for 2 hours to obtain a molded silica binder L type zeolite.

0.086 g of tetramineplatinum chloride, 0.088 g of ammonium fluoride, 0.019 g of ammonium chloride and 2.1 g of ion exchanged water were mixed to prepare an impregnation solution. The thus prepared impregnation solution was slowly added dropwise to 5 g of the above-mentioned molded L type zeolite with silica binder to support platinum and the halogens thereon. In a drying step, initial vacuum rotary drying was done at 40° C. for 2 hours, and the temperature was then raised up to 100° C. over 40 minutes in a vacuum rotary condition, followed by the vacuum rotary drying at 100° C. for 30 minutes. Incidentally, a vacuum degree in the vacuum rotary drying was 40 Torr. Afterward, calcination was carried out at 320° C. for 1 hour in air to prepare a catalyst.

COMPARATIVE EXAMPLE 1

(1) Preparation of a Catalyst 5 g of an L type zeolite accomplished till a supporting step in Example 1 was heated in a vacuum rotary drying condition from room temperature to 100° C. over 60 minutes, and the temperature was kept at 100° C. for 3 hours also in a vacuum rotary drying condition. The same procedure as in Example 1 was conducted except for the drying step. Incidentally, a vacuum degree in the vacuum rotary drying was 40 Torr.

EXAMPLE 2

(1) Preparation of a Catalyst 5 g of an L type zeolite accomplished till a supporting and treating step in Example 1 was heated in a vacuum rotary drying condition from 40° C. to 100° C. over 2 hours and 30 minutes, and the temperature was kept at 100° C. for 3 hours also in a vacuum rotary drying condition. The same procedure as in Example 1 was conducted except for the drying step. Incidentally, a vacuum degree in the vacuum rotary drying was 40 Torr.

EXAMPLE 3

(1) Preparation of a Catalyst 5 g of an L type zeolite accomplished till a supporting and treating step in Example 1 was heated from room temperature to 90° C. under atmospheric pressure over 2 hours while rotated, and then the temperature was kept at 90° C. for 3 hours also in atmospheric rotary condition. The same procedure as in Example 1 was conducted except for the drying step.

EXAMPLE 4

(1) Preparation of a Catalyst 5 g of an L type zeolite accomplished till a supporting and treating step in Example 1 was heated in a vacuum rotary drying condition from 40° C. to 100° C. over 100 minutes, and the temperature was kept at 100° C. for 30 minutes also in a vacuum rotary drying condition. The same procedure as in Example 1 was conducted except for the drying step. Incidentally, a vacuum degree in the vacuum rotary drying was 40 Torr.

EXAMPLE 5

(1) Preparation of a Catalyst 5 g of an L type zeolite accomplished till a supporting and treating step in Example 1 was heated from room temperature to 90° C. under atmospheric pressure over 3 hours while rotated, and then the temperature was kept at 90° C. for 3 hours also in atmospheric rotary condition. The same procedure as in Example 1 was conducted except for the drying step.

(2) Evaluation of Catalytic Properties

Measurement of Water Content

In each of the above-mentioned examples and comparative example, a catalyst was taken out during its drying, and a water content was measured by TG-DTA. 10 mg of the catalyst was weighed while it was in the form of a molded article, and then set on a device. A temperature was raised from room temperature to 1000° C. at an air flow of 70 cc/min. A temperature rise rate was 20° C./min. A weight of the catalyst decreased until 500° C. was reached was regarded as the water content, and an evaporation rate was calculated. The results are shown in Table 1.

EPMA Measurement

Each of the catalysts obtained above was wrapped in a resin (PMMA: polymethyl methacrylate), and the resin including the catalyst was then cut in a parallel with a bottom surface to expose such a measurement surface as shown in FIG. 2. By the use of a usual EPMA device, an α value was measured at an acceleration voltage of 15 kV, a beam size of 1 μm and a sample current of 0.05 μA. The results are shown in Table 1.

Evaluation of Pulse Reaction

Each of the obtained catalysts was ground into 32 to 65 mesh, and 50 mg of the ground catalyst was weighed and then filled into a reactor. After the reactor was set on a device, a temperature was raised from room temperature to 540° C. over 35 minutes at a hydrogen flow rate of 100 cc/min, and hydrogen reduction was then carried out at 540° C. for 1 hour. After completion of the hydrogen reduction, the temperature was set to 460° C. As a reactant substance, an n-$C_6$ was used. A pulse size was changed to 0.5 μl, 1.0 μl, 2.0 μl and 3.0 μl to change a conversion. The results are shown in Table 1. The lower a $C_{1-4}$ selectivity is, the better the catalyst is. Incidentally, for each product, the $C_{1-4}$ selectivity was calculated as follows.

$C_{1-4}$ selectivity=[$C_{1-4}$ weight/($C_{1-5}$+benzene) weight]×100

TABLE 1

| | Water Evaporation Rate (wt %/hr) | Cl Distribution by EPMA (α) | $C_{1-4}$ Selectivity at Benzene Yield of 60 wt % (wt %) |
|---|---|---|---|
| Example 1 | 6 | 0.12 | 3.0 |
| Comp. Ex. 1 | 30 | 0.20 | 10.5 |
| Example 2 | 6 | 0.12 | 3.0 |
| Example 3 | 15 | 0.17 | 5.5 |
| Example 4 | 15 | 0.15 | 5.0 |
| Example 5 | 4 | 0.06 | 2.5 |

Possibility of Industrial Utilization

Therefore, a halogen-containing catalyst and its preparation process of the present invention can widely and effectively be utilized in fields of a petroleum chemical industry in which aromatic hydrocarbons are manufactured, a petroleum industry in which a high octane value fuel is manufactured, and the like.

What is claimed is:

1. A halogen-containing catalyst which contains one or more halogen components and in which the halogen amount distribution in the catalyst is uniform wherein, in a drawing showing a relation between a sectional width direction distance (x: a distance from one catalyst surface) and an X-ray intensity (I) obtained by subjecting a halogen atom on a catalyst section to a linear analysis measurement in one direction by the use of an electron probe microanalysis (an EPMA) device, a ratio α [{(F–$F_0$)/F} of a value (F–$F_0$) to an integrated value (F)] is 0.17 or less, and the value (F–$F_0$) is calculated by subtracting a value ($F_0$) obtained by integrating an X-ray intensity ($I_0$) of a tangent of a curve at the minimum and smallest value of the curve indicating the X-ray intensity with respect to x between one catalyst surface and the other catalyst surface, from the value (F) obtained by integrating the above-mentioned I with respect to x between the surfaces.

2. The halogen-containing catalyst according to claim 1 which comprises one or more halogen components and a platinum supported on L type zeolite.

3. The halogen-containing catalyst according to claim 1, wherein the ratio α is 0.15 or less.

4. A process for preparing a halogen-containing catalyst wherein, in a drawing showing a relation between a sectional width direction distance (x: a distance from one catalyst surface) and an X-ray intensity (I) obtained by subjecting a halogen atom on a catalyst section to a linear analysis measurement in one direction by the use of an electron probe microanalysis (an EPMA) device, a ratio α [{(F–$F_0$)/F} of a value (F–$F_0$) to an integrated value (F)] is 0.17 or less, and the value (F–$F_0$) is calculated by subtracting a value ($F_0$)

obtained by integrating an X-ray intensity ($I_0$) of a tangent of a curve at the minimum and smallest value of the curve indicating the X-ray intensity with respect to x between one catalyst surface and the other catalyst surface, from the value (F) obtained by integrating the above-mentioned I with respect to x between the surfaces, which comprises the steps of supporting one or more halogen components on a carrier, and then drying it at a water evaporation rate of 15% by weight/hour or less.

5. The process for preparing a halogen-containing catalyst according to claim 4 wherein the water evaporation rate is 10% by weight/hour or less.

6. The process for preparing a halogen-containing catalyst according to claim 4 wherein the drying is carried out at a temperature and then at a higher temperature.

7. The process for preparing a halogen-containing catalyst according to claim 4 wherein vacuum drying is carried out.

8. The process according to claim 4, wherein the ratio $\alpha$ is 0.15 or less.

9. A process for preparing a halogen-containing catalyst wherein, in a drawing showing a relation between a sectional width direction distance (x: a distance from one catalyst surface) and an X-ray intensity (I) obtained by subjecting a halogen atom on a catalyst section to a linear analysis measurement in one direction by the use of an electron probe microanalysis (an EPMA) device, a ratio $\alpha[\{(F-F_0)/F\}$ of a value $(F-F_0)$ to an integrated value (F)] is 0.17 or less, and the value $(F-F_0)$ is calculated by subtracting a value $(F_0)$ obtained by integrating an X-ray intensity ($I_0$) of a tangent of a curve at the minimum and smallest value of the curve indicating the X-ray intensity with respect to x between one catalyst surface and the other catalyst surface, from the value (F) obtained by integrating the above-mentioned I with respect to x between the surfaces, which comprises the steps of supporting one or more halogen components and one or more metals on a carrier, and then drying it at a water evaporation rate of 15% by weight/hour or less.

10. The process for preparing a halogen-containing catalyst according to claim 9 wherein the water evaporation rate is 10% by weight/hour or less.

11. The process for preparing a halogen-containing catalyst according to claim 9 wherein the drying is carried out at a temperature and then at a higher temperature.

12. The process for preparing a halogen-containing catalyst according to claim 9 wherein vacuum drying is carried out.

13. The process according to claim 9, wherein the ratio $\alpha$ is 0.15 or less.

14. A process for preparing a halogen-containing catalyst wherein, in a drawing showing a relation between a sectional width direction distance (x: a distance from one catalyst surface) and an X-ray intensity (I) obtained by subjecting a halogen atom on a catalyst section to a linear analysis measurement in one direction by the use of an electron probe microanalysis (an EPMA) device, a ratio $\alpha\,[\{(F-F_0)/F\,\}$ of a value $(F-F_0)$ to an integrated value (F)] is 0.17 or less, and the value $(F-F_0)$ is calculated by subtracting a value $(F_0)$ obtained by integrating an X-ray intensity ($I_0$) of a tangent of a curve at the minimum and smallest value of the curve indicating the X-ray intensity with respect to x between one catalyst surface and the other catalyst surface, from the value (F) obtained by integrating the above-mentioned I with respect to x between the surfaces, which comprises the steps of supporting one or more halogen components and a platinum on an L type zeolite, and then drying it at a water evaporation rate of 15% by weight/hour or less.

15. The process for preparing a halogen-containing catalyst according to claim 14 wherein the water evaporation rate is 10% by weight/hour or less.

16. The process for preparing a halogen-containing catalyst according to claim 14 wherein the drying is carried out at a temperature and then at a higher temperature.

17. The process for preparing a halogen-containing catalyst according to claim 14 wherein vacuum drying is carried out.

18. The process according to claim 14, wherein the ratio $\alpha$ is 0.15 or less.

19. A process for preparing a halogen-containing catalyst wherein, in a drawing showing a relation between a sectional width direction distance (x: a distance from one catalyst surface) and an X-ray intensity (I) obtained by subjecting a halogen atom on a catalyst section to a linear analysis measurement in one direction by the use of an electron probe microanalysis (an EPMA) device, a ratio $\alpha\,[\{(F-F_0)/F\}$ of a value $(F-F_0)$ to an integrated value (F)] is 0.17 or less, and the value $(F-F_0)$ is calculated by subtracting a value $(F_0)$ obtained by integrating an X-ray intensity ($I_0$) of a tangent of a curve at the minimum and smallest value of the curve indicating the X-ray intensity with respect to x between one catalyst surface and the other catalyst surface, from the value (F) obtained by integrating the above-mentioned I with respect to x between the surfaces, which comprises the steps of supporting one or more halogen components on a carrier, drying it at a water evaporation rate of 15% by weight/hour or less, and then supporting platinum thereon.

20. The process according to claim 19, wherein the ratio $\alpha$ is 0.15 or less.

21. A method comprising producing aromatic hydrocarbons from non-aromatic hydrocarbons in the presence of the halogen-containing catalyst described in claim 1.

* * * * *